United States Patent [19]
Saito et al.

[11] Patent Number: 5,095,706
[45] Date of Patent: Mar. 17, 1992

[54] START-UP METHOD OF STEAM TURBINE PLANT AND CONDENSER EMPLOYED FOR SAID METHOD

[75] Inventors: Kohei Saito; Hiroki Yamagishi; Toshiki Furukawa; Toshio Sato, all of Kanagawa; Hiroshi Hamano, Chiba; Yoshio Nakano, Tokyo; Katsuaki Tanaka; Satoru Sakamoto, both of Kanagawa, all of Japan

[73] Assignee: Kabushiki Kaisha Toshiba, Kawasaki, Japan

[21] Appl. No.: 673,076

[22] Filed: Mar. 21, 1991

[30] Foreign Application Priority Data

Mar. 23, 1990 [JP] Japan .................. 2-074613

[51] Int. Cl.⁵ .............................. F01K 13/02
[52] U.S. Cl. .......................... 60/646; 60/692
[58] Field of Search ............. 60/646, 657, 690, 692

[56] References Cited
U.S. PATENT DOCUMENTS 4,353,213 10/1982 Masuda et al. ............. 60/692 X
4,631,925 12/1986 Ohtake et al. ............. 60/692 X

FOREIGN PATENT DOCUMENTS

59-145484 8/1984 Japan .

*Primary Examiner*—Allen M. Ostrager
*Attorney, Agent, or Firm*—Oblon, Spivak, McClelland, Maier & Neustadt

[57] ABSTRACT

A start-up method of a steam turbine plant including a condenser is disclosed. The condenser includes a tube bundle composed of a number of pipes for condensing an exhaust steam from a steam turbine and a hot well for receiving and storing a condensate therein. The interior of the condenser is airtightly divided into two spaces with a partition therebetween, one of them being an upper space containing the tube bundle and the other one being a lower space containing the hot well. A communication passageway(s) extends between the upper space and the lower space with an isolation valve in the form of a butterfly valve disposed on the communication passageway. At the shut-down of the steam turbine plant, the isolation valve is closed to isolate the upper space from the lower space while the lower space is maintained in vacuum. At the start-up of the steam turbine plant, the isolation valve is opened after the upper space is evacuated, and the upper space is then communicated with the lower space which is maintained still in vacuum.

11 Claims, 7 Drawing Sheets

START-UP METHOD OF STEAM TURBINE PLANT AND CONDENSER EMPLOYED FOR SAID METHOD

BACKGROUND OF THE INVENTION

1. Field of the Invention

The present invention relates generally to a steam turbine plant. More particularly, the present invention relates to a start-up method of the steam turbine plant wherein at the start-up of the steam turbine plant, a condensate supplied into a condenser is deaerated so as to allow the condensate to be supplied to a boiler within a short time.

Further, the present invention relates to a condenser serving to condense an exhaust steam from a steam turbine thereby produce a condensate wherein the condenser is preferably employable for practicing the foregoing start-up method of a steam turbine plant.

2. Description of the Related Art

In recent years, a combined cycle power plant has been highly evaluated as a power generating system which assures that two excellent properties, i.e., a facility of load change and a high thermal efficiency can be achieved. To raise up a level of the excellent properties as mentioned above further, research and development works have been conducted so as to improve a method of operating a power plant and apparatuses and instruments associated with the foregoing method. The latest remarkable activity with respect to the method of operating a power plant is a shift from a base load operation to a daily start and stop operation (hereinafter referred to simply as a DSS operation). Accordingly, research and development works have been conducted based on the DSS operation for the purpose of improving apparatuses and instruments associated with a steam turbine plant.

To facilitate understanding of the present invention, a typical conventional combined cycle power plant will briefly be described below with reference to FIG. 7.

Figure 7:
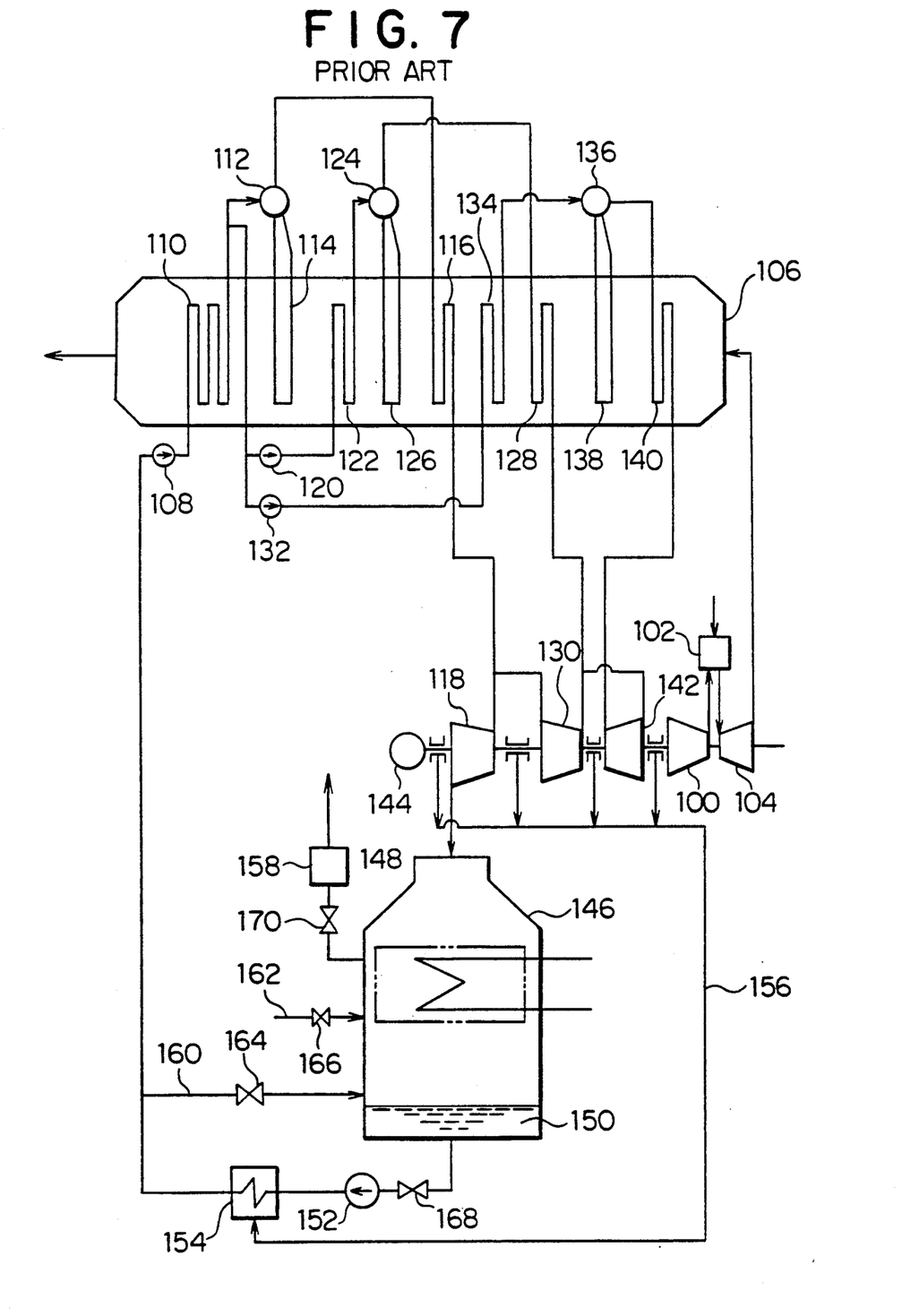
FIG. 7 is an illustrating view which schematically showing essential components required for practicing a typical conventional start-up method of a steam turbine plant.

As shown in FIG. 7, an air pressurized by a compressor 100 is supplied into a combustion chamber 102 in which the pressurized air is mixed with a fuel supplied via a fuel supply system (not shown) to generate a combustion gas having an elevated temperature. The combustion gas is then supplied into a gas turbine 104 as a working fluid for rotating the gas turbine 104. Since the combustion gas which has been expanded after the usage for the rotation of the gas turbine 104 has still a high temperature (about 550° C.), it is delivered from the gas turbine 104 to a heat recovery steam generator (hereinafter referred to simply as HRSG) 106 in which it serves as a working fluid for a heat supply source available for a steam turbine system. Thereafter, the combustion gas is discharged to an atmosphere as an exhaust gas.

On the other hand, a feed water pressurized by a low pressure feed water pump 108 in the steam turbine system is first supplied into a low pressure economizer 110 in which the pressurized feed water is heated by the combustion gas from the gas turbine 104 flowing through the HRSG 106. Thereafter, the pressurized feed water is distributed to three systems, i.e., a lower pressure system, an intermediate pressure system and a high pressure system.

With respect to the low pressure system, the feed water is fed from a low pressure steam drum 112 to a low pressure evaporator 114 in which it is heated and evaporated as a steam. The resultant steam is superheated in a low pressure superheater 116 and the superheated steam is then supplied into a low pressure turbine 118.

With respect to the intermediate pressure system, the feed water is pressurized by an intermediate pressure feed water pump 120 and the pressurized feed water is then fed via an intermediate pressure economizer 122 and an intermediate pressure steam drum 124 to an intermediate pressure evaporator 126 in which the pressurized feed water is heated and evaporated as a steam. The steam is superheated in an intermediate superheater 128 and the superheated steam is then supplied into an intermediate pressure turbine 130.

With respect to the high pressure system, the feed water is pressurized by a high pressure feed pump 132 and the pressurized steam is then fed via a high pressure steam drum 136 to a high pressure evaporator 138 in which it is heated and evaporated as a steam. The steam is superheated in a high pressure superheater 140 and the superheated steam is then supplied into a high pressure turbine 142.

As is apparent from the drawing, the low pressure turbine 118, the intermediate pressure turbine 130, the high pressure turbine 142 and the gas turbine 104 are connected directly to a generator 144 in which an electric power is generated, respectively.

Further, exhaust steams from the low pressure turbine 118, the intermediate turbine 130 and the high pressure turbine 142 are delivered to a condenser 146 in which the exhaust steams are condensed by a cooling water flowing through a number of condenser tubes constituting a tube bundle 148. Water falls down on a hot well 150 in the condenser 146 in which it is received and stored as a condensate. Thereafter, the condensate is extracted from the hot well 150 by a condensate pump 152 and then delivered to the low pressure feed water pump 108 via a gland steam condenser 154.

Steams leaked from glands of the respective turbines (i.e., the low pressure turbine 118, the intermediate pressure turbine 130 and the high pressure turbine 142) are collected via a gland steam pipe 156 in the gland steam condenser 154 in which the leaked steams are condensed by condensate and thereby a thermal energy of the leaked steam is recovered.

In addition, the condenser 146 is provided with a venting equipment 158 for extracting a non-condensibles and associated water vapor to produce the minimum steam condensing pressure.

To lower a dissolved oxygen concentration of the condensate during operation of the steam turbine plant, a part of the condensate is returned via a condensate recirculating system 160 to the condenser 146 in which it is subjected to deaeration while it is heated by the exhaust steam from the steam turbine system.

In FIG. 7, reference numeral 162 designates a makeup water pipe through which a makeup water is additionally supplied to the condenser 146 to compensate for shortage of a condensate when a quantity of the condensate stored in the condenser 146 is excessively reduced, reference numeral 164 designates a stop valve disposed on the condensate recirculating system 160, reference numeral 168 designates a stop valve disposed on the inlet side of the condensate pump 152 and reference numeral 170 designates a stop valve disposed on the inlet side of the venting equipment 158.

With the steam turbine plant as constructed in the above-described manner, when a dissolved oxygen concentration of the condensate is elevated, there arises a certain malfunction. For example, the pipes in the HRSG 106 are corroded intensely. To avoid an occurrence of the malfunction as mentioned above, it has been required that the dissolved oxygen concentration is maintained within the range lower than 80 ppb at the time when operation of the steam turbine plant is to be started.

During the shut-down of the steam turbine plant, a large quantity of condensate is stored in the hot well 150 in the condenser 146 in preparation of next start-up operation of the steam turbine plant. However, since an atmospheric air is unavoidably penetrated into the interior of the condenser 146 during the shut-down of the steam turbine plant, a long period of waiting time elapses until operation of the steam turbine plant is started, as the condensate is brought in contact with the atmospheric air. For this reason, a large quantity of oxygen is dissolved in the condensate with the result that the dissolved oxygen concentration varies to a very high value in excess of a preset value of 7 ppb which should be maintained during operation of the steam turbine plant. For example, provided that no measure is taken not only to prevent an atmospheric air from penetrating the condenser 146 but also to prevent an oxygen in the atmospheric air from being dissolved in the condensate, a value of the dissolved oxygen concentration is raised up to a high value of 10000 ppb.

Provided that the dissolved oxygen concentration which has been raised up to a level of 10000 ppb should be lowered to 80 ppb with the aid of the condensate recirculating system 160, there is required a long time to deaerate the condensate. Thus, there is a possibility that a time consumed for deaerating at every time of DSS operation is elongated and the steam turbine plant fails to quickly meet the requirement from the electricity consumers' side.

SUMMARY OF THE INVENTION

The present invention has been made with the foregoing background in mind.

An object of the present invention provides a start-up method of a steam turbine plant wherein a period of time consumed for setting a dissolved oxygen concentration of condensate to a predetermined level required at the time when operation of the steam turbine plant is to be started is minimized by deaerating a condensate remaining in a hot well of a condenser.

Another object of the present invention is to provide a condenser serving to condensate an exhaust steam from a steam turbine thereby to produce a condensate wherein the condenser is preferably employable for practicing the foregoing method of start-up operation of a steam turbine plant.

To accomplish the former object, the present invention provides a start-up method of a steam turbine plant including a condenser wherein a tube bundle for condensing an exhaust steam from a steam turbine and a hot well for storing a condensate therein are arranged in the interior of a condenser shell, wherein the interior of the condenser shell is airtightly divided into two parts with a partition plate therebetween, one of them being an upper space containing the tube bundle and the other one being a lower space containing the hot well; at least one connecting pipe extends between the upper space and the lower space, the connecting pipe being provided with an islation valve to isolate the both spaced at the position therebetween; at the shut-down of steam turbine plant, the isolation valve on the connecting pipe is closed to isolate the lower space from the upper space and to maintain the lower space in vacuum and; at the start-up of the steam turbine plant, the isolation valve on the connecting pipe is opened after the upper chamber is evacuated, whereby the upper space is communicated with the lower space which has been maintained in vacuum.

Further, to accomplish the latter object, the present invention provides a condenser serving to condense an exhaust steam from a steam turbine thereby to produce a condensate wherein the condenser is employable for practicing a startup method of a steam turbine plant, wherein the condenser comprises a condenser shell constructed in the form of a container; a water inlet chamber arranged on the one side of the condensate shell and a water outlet chamber arranged on the outer side of the same; a tube bundle composed of a number of tubes through which a cooling water flows, the tubes extending in the shell so as to communicate the water inlet chamber with the water outlet chamber; a hot well arranged below the tube bundle to receive and store therein the condensate which has been produced by condensation of the exhaust steam with the aid of the cooling water flowing through the tube bundle; a partition plate serving to airtightly divide the interior of the shell into two spaces, one of them being an upper space containing the tube bundle and the other one being a lower space containing the hot well; at least one connecting pipe by way of which the bottom of the upper space is communicated with the lower space; and at least one isolation valve which isolates the both the chambers from each other, the isolation valve being disposed on the connecting pipe.

Other objects, features and advantages of the present invention will become apparent from the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiments of the present invention.

Figure 1:
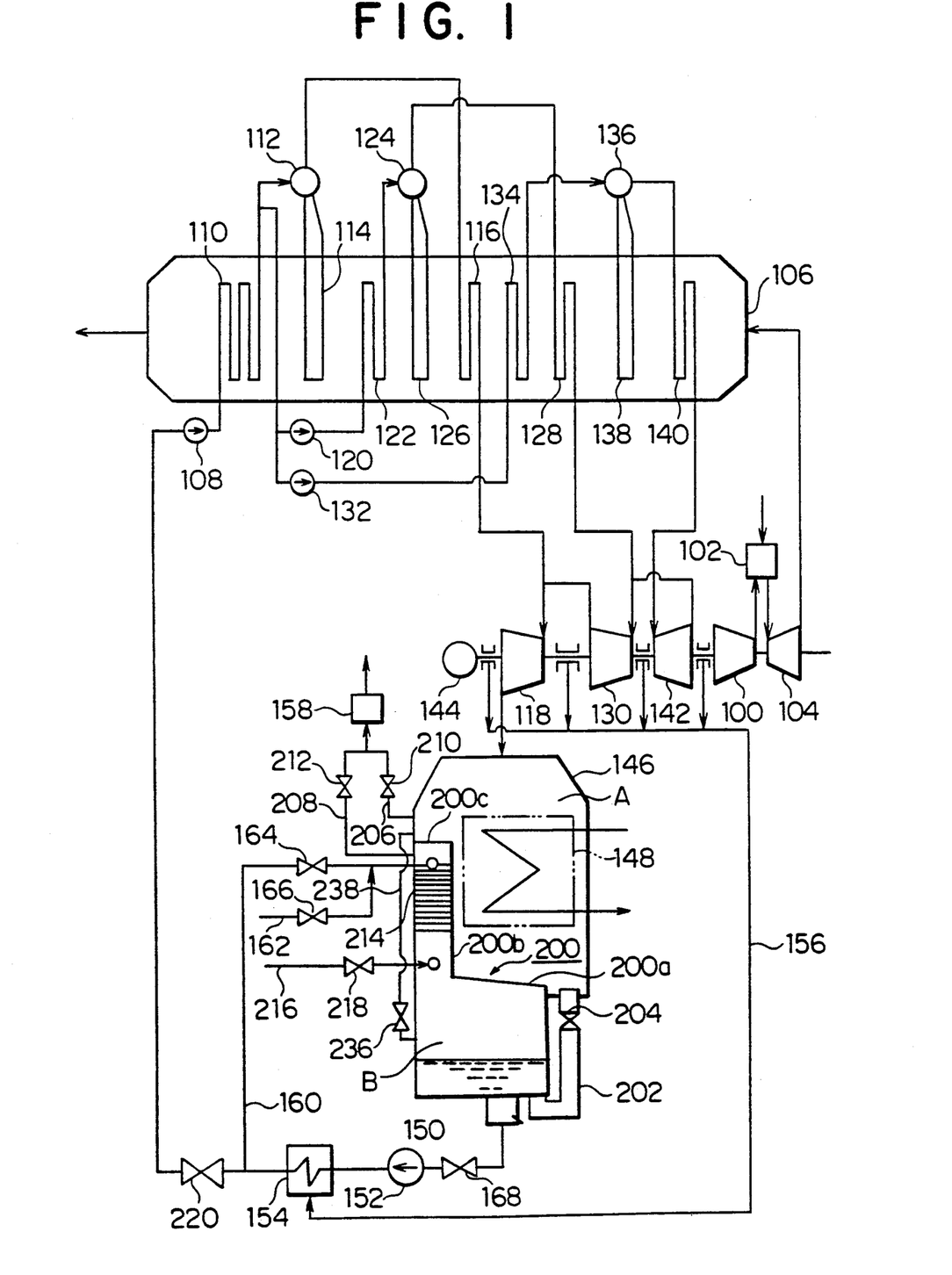
FIG. 1 is an illustrative view which schematically shows essential components for practicing a start-up method of a steam turbine plant in accordance with an embodiment of the present invention.

Referring to FIG. 1, the interior of a condenser 146 is airtightly divided into two spaces with a partition 200 therebetween, one of them being an upper space A and the other one being a lower space B. The partition 200 is essentially composed of an intermediate bottom plate 200a arranged below a tube bundle 148 composed of a number of the condenser pipes to be described later, a vertical plate 200b arranged in the vicinity of the side wall of the condenser shell and a ceiling plate 200c extending from the upper end of the vertical plate 200b in the horizontal direction to be connected to a shell of the condenser 146. The condenser 146 includes two connecting pipes 202 between the upper space A and the lower space B each of which serves as a communication passageway therebetween for allowing a condensate to flow therethrough, and an isolation valve 204 isolating the both spaces is disposed on each of the connecting pipes 202. As is apparent from the drawing, the tube bundle 148 is in the upper space A and a hot well 140 is constituted in the lower space B.

In addition, the condenser 146 includes a first air extracting pipe 206 by way of which the upper space A is communicated with a venting equipment 158 and a second air extracting pipe 208 by way of which the lower space B is communicated with the venting equipment 158. A stop valve 210 is disposed midway of the first air extracting tube 206, while a stop valve 212 is disposed on the second air extracting pipe 208.

A condensare recirculating system 160 branches off from the feed water line. The condensate recirculating system 160 is provided with a stop valve 164 and it is connected to the position above the hot well 150 in the lower space B. A deaerating unit 214 is arranged between the hot well 150 and the outlet of the condensate recirculating system 160 so as to allow a condensate extracted from the hot well 150 to flow back to the hot well 150 through the deaerating unit 214. To eject a heating steam toward the condensate which has been transformed into a number of water drops, a heating steam pipe 216 is connected to the condenser 146 at the position below the deaerating unit 214 while a stop valve 218 is disposed on the heating steam pipe 216.

In FIG. 1, reference numeral 220 designates a stop valve which serves to isolate a feed water system from the condensate recirculating system 160. While the stop valve 220 is kept closed, the system 160 only operates so as to allow the condensate to be recirculated therethrough.

Figure 2:
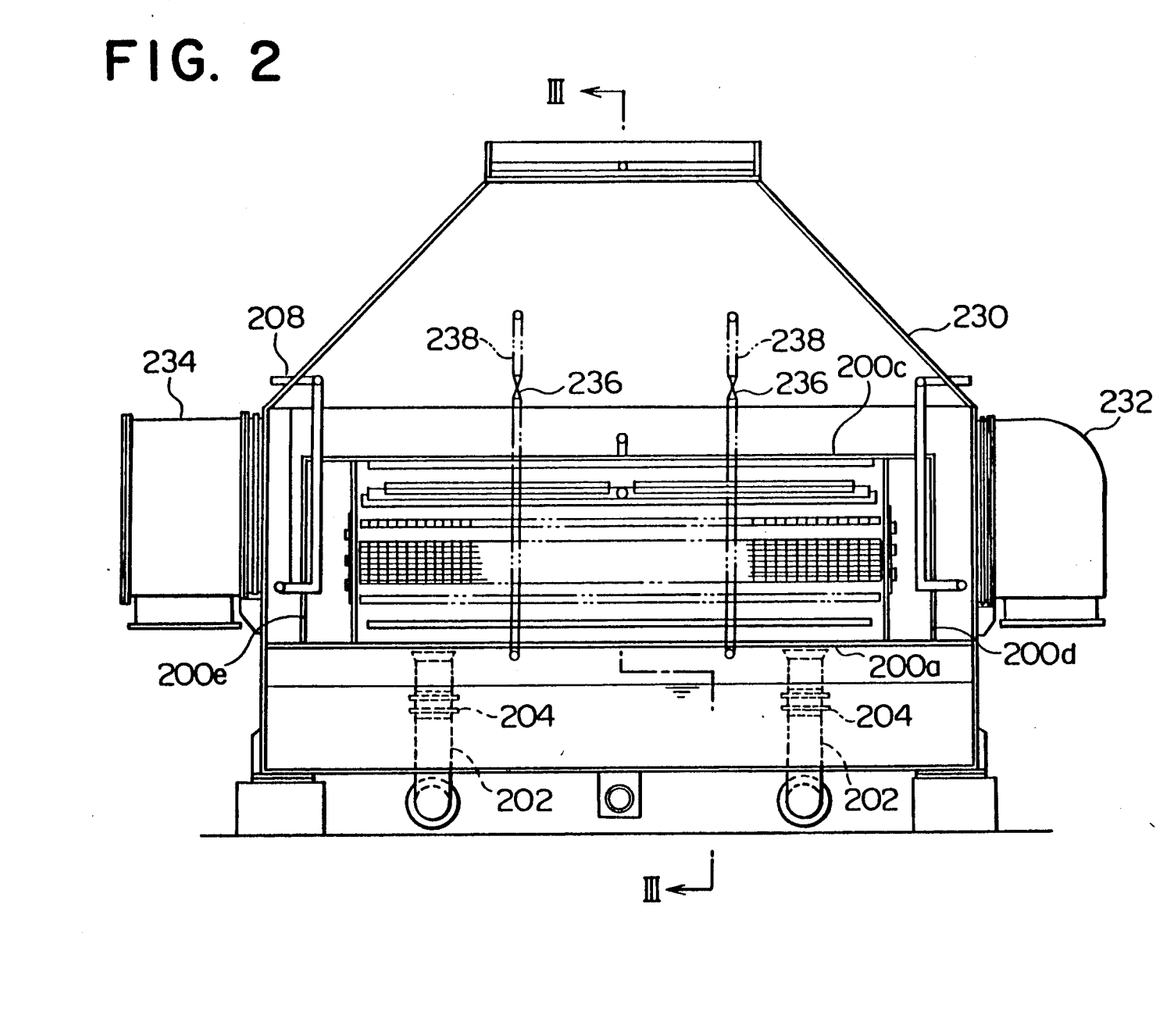
FIG. 2 is a sectional view which shows the structure of a condenser employed for practicing the method of the invention.
Figure 3:
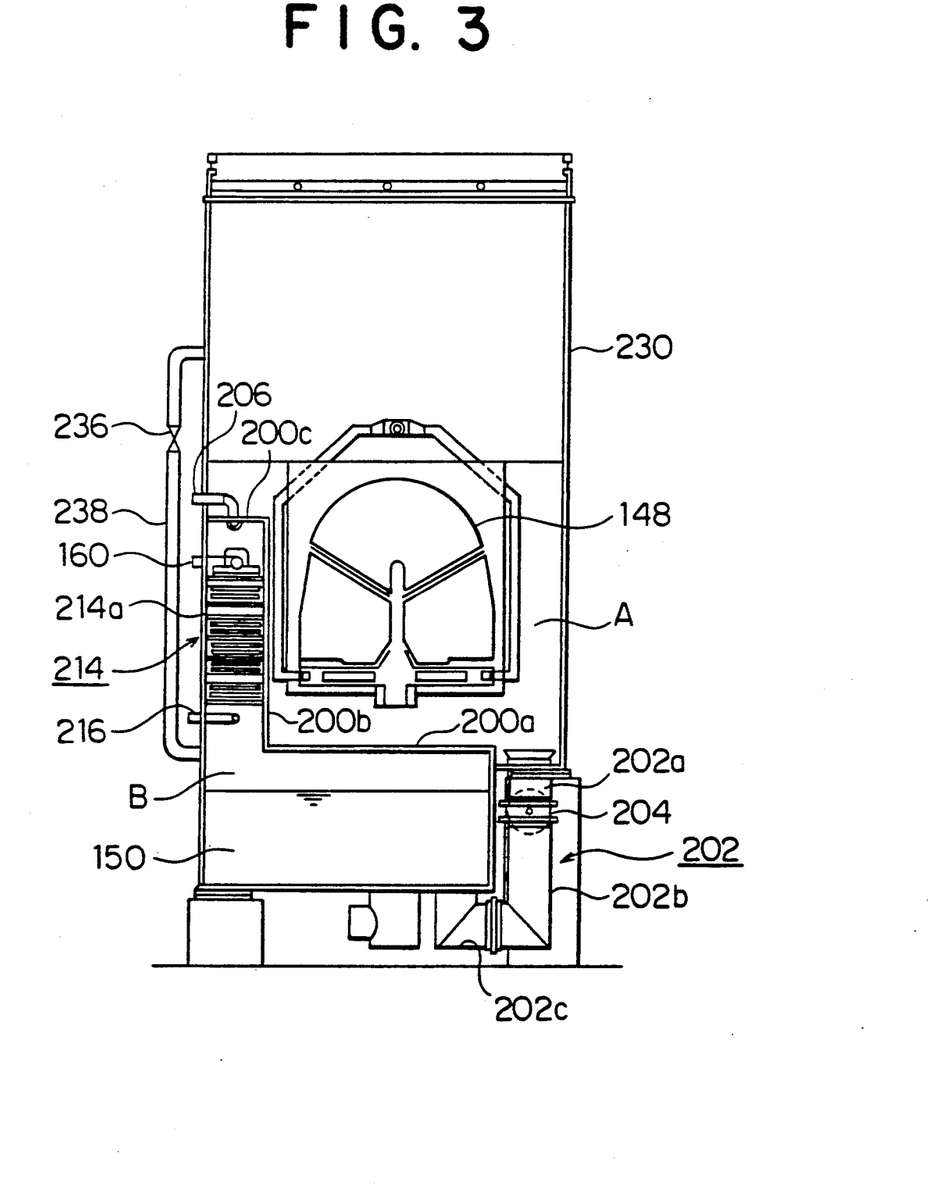
FIG. 3 is a sectional view of the condenser taken along line III—III in FIG. 2.

FIG. 2 and FIG. 3 show a detailed structure of the condenser 146 in accordance with an embodiment of the present invention, respectively. In FIG. 2, reference numeral 230 designates a shell of the condenser. The water inlet chamber 232 and the water outlet chamber 234 are connected to each side of the condenser shell. A number of condenser tubes constituting the tube bundle 148 extend between the water inlet chamber 232 and the water outlet chamber 234, and a cooling water flows through each of the condensate pipes.

As is best seen in FIG. 3, the intermediate bottom plate 200a is arranged below the tube bundle 148 and the vertical plate 200b is arranged peripheral to the side wall of the condenser shell. The ceiling plate 200c is arranged such that it extends between the upper end of the vertical plate 200b and the inner wall surface of the condenser shell. Further, as shown in FIG. 2, an enclosure plate 200d is arranged so as to surround the right-hand end part of the region defined by the vertical plate 200b and the ceiling plate 200c, while an enclosure plate 200e is arranged so as to surround the left-hand end part of the region defined by the same. With such construction, the interior of the condenser 146 is divided into the upper space A and the lower space B with the partition 200 therebetween in the above-described manner while reliably maintaining airtightness of the condenser 146.

Referring to FIG. 2 again, the upper space A and the lower space B are communicated with each other by way of two connecting pipes 202 each serving as a communication passageway through which a condensate flows. Each of the communication pipes 202 is composed of a straight pipe portion 202a connected to the upper space A, a L-shaped pipe portion 202b and a pipe portion 202c connected to the lower space B, and these pipe portions 202a, 202b and 202c are connected not only to each other but also to the upper and lower spaces A and B by using flanges. An isolation valve 204 is disposed on each connecting pipe 202. Since each connecting pipe 202 is constructed in the above-described manner, the respective pipe portions 202a, 202b and 202c can easily be disconnected from the pipe line of the connecting pipe 202 after the flanges at the opposite ends of the L-shaped pipe portion 202b are detached. Therefore, a maintenance work such as inspection and renewal of an isolation valve 204 can easily be performed. To assure that airtightness is reliably maintained when the isolation valve 204 is closed, the isolation valve 204 is preferably constructed in the form of a butterfly valve. When the isolation valve 204 is held at the opened position, the condensate can flow through the connecting pipe 202 which serves as a passageway.

The deaerating unit 214 is accommodated in the specially designed section of the lower space B sideward of the tube bundle 148 which is arranged in the upper space A. The deaerating unit 214 is composed of many deaerating trays 214 in the multi-layered structure. As the condensate is fed to the condenser 146 through the condensate recirculating system 160, it is transformed into a number of water drops by a spray pipe above the deaerating unit 214 and then the water drops flow down between the deaerating trays 214a in the zigzag fashion until they come directly in contact with a heating steam in the lower space B while they are stirred therein.

It should be added that the upper space A and the lower space B are communicated with each other by way of a balance pipe 238 which has a stop valve 236 disposed midway therebetween. While a steam turbine plant operates continuously, the stop valve 236 is kept fully opened and thereby pressure in the upper space A and the lower space B is equalized to each other.

Next, a procedure of shut-down and start-up operation of the steam turbine plant will be described below.

At shut-down of the steam turbine plant, first, the isolation valves 204 disposed on the connecting pipes 202 is fully closed and at the same time, the stop valve 168 disposed on the inlet side of the condensate pump 152 is closed. It should be noted that the stop valve 210 on the first air extracting pipe 206 communicated with the upper space A and the stop valve 212 on the second air extracting pipe 208 communicated with the lower space B are kept opened before shut-down operation, respectively, whereby pressure in the upper space A and the lower space B is equalized to each other.

Subsequently, the both air stop valves 210 and 213 are closed. Additionally, the stop valve 236 on the balance pipe 238 is fully closed. This allows operation of the venting equipment 158 to be interrupted, whereby pressure in the upper space A is equalized to atmosphere. At this time, however, since the lower space B is entirely isolated from the outside environment by virtue of the function of the isolation valve 204 and the stop valve 168 both of which are kept still closed, the vacuum in the lower chamber B is maintained unchangeably. Accordingly, there is few possibility that an oxygen is dissolved in the condensate in the hot well 150. If a plant shut-down period is short, 7 ppb of a dissolved oxygen concentration indicative of a limited value can be maintained without interruption.

Since the procedure of start-up operation of the steam turbine plant in a case where shut-down period of the steam turbine plant is short like in the DSS operation is basically different from the procedure of start-up operation of the steam turbine plant in a case where shut-down period of the steam turbine plant is long, description will be made below with respect to each of the two cases as mentioned above.

(1) As to the case where the plant shut-down period is short:

In this case, the vacuum in the lower space B is maintained unchangeably and a condensate having a low level of dissolved oxygen concentration is stored in the hot well 150. During the operation of the plant start-up, the stop valve 212 on the second air extracting tube 208 is opened thereby to bring the venting equipment 158 in an operative state. While the stop valve 220 is kept closed, driving of a condensate pump 152 is started as the stop valve 168 is opened. Thus, while the condensate is supplied to a gland steam condenser 154, gland sealing steams leaked from respective steam turbine 118, 130 and 140 are condensed in the gland steam condenser 154 via a gland steam pipe 156. This prevents an air inflow in the condenser from gland portions of the respective steam turbines 118, 130 and 142. At this time, the condensate which has been supplied to the gland steam condenser 154 is recovered in the condenser 146 via the condensate recirculating system 160 but there is not any particular necessity for allowing the recovered condensate to be subjected to deaerating, since the condensate has a low level of dissolved oxygen concentration.

Subsequently, the stop valve 210 on the first air extracting pipe 206 communicated with the upper space A to vacuum up the upper space A is opened. When it is confirmed that the pressure in the upper space A is equalized to the pressure in the lower space B, the isolation valves 204 is opened while the air shut-off valve 236 is kept fully opened, whereby the upper space A is communicated with the lower space B.

Thereafter, the stop valve 220 is opened, causing the condensate extracted from the hot well 150 to be fed to steam drums 112, 124 and 136 with the aid of feed water pumps 108, 120 and 132. When it is required that a makeup water is additionally supplied to the hot well 150 in the course of the aforementioned starting process, a stop valve 166 disposed on a makeup water pipe 162 is opened so as to allow a makeup water to be supplied into the hot well 150 via the makeup water pipe 162. Provided that a water to be fed is previously deaerated by employing a method to be described later, a limited value of 80 ppb and lower specified for the plant startup can easily be maintained irrespective of any high level of dissolved oxygen concentration of the makeup water.

As is apparent from the above description, when the starting process proceeds in accordance with the aforementioned procedure, the present pressure in the lower space B can continuously be maintained by virtue of the function of the isolation valves 204 and the stop valve 168. Thus, while a very small quantity of oxygen is dissolved in the condensate, a considerably long period of time (1 to 2 hours) consumed for deaerating at the starting time as is often the case with the conventional method which has been described above with reference to FIG. 7 can be eliminated at all.

(2) As to the case where the plant shut-down period is long:

A procedure of start-up operation of the steam turbine plant after it has been shut down for a long time is executed in the following manner.

First, the isolation valves 204 and the stop valve 168 are fully closed so as to allow an air remaining in the lower space B to be extracted therefrom by the venting equipment 158. When it is confirmed that the present pressure in the lower space B reaches a preset value, a stop valve 216 disposed on a heating steam line 216 is opened, whereby a heating steam is supplied into the interior of the lower space B.

Subsequently, the condensate which has been recovered in a makeup water tank (not shown) is supplied into the upper part of the deaerating unit 214 via the makeup water pipe 162, in which the water is transformed into a large number of water drops by a spray pipe. Then, while the water drops are deaerated by the heating steam delivered via the heating steam pipe 216, they are supplied to the hot well 150 until a predetermined quantity of condensate is filled in the hot well 150.

Next, as the condensate is delivered to the gland steam condenser 154 by driving the condensate pump 152 while the stop valves 220 are kept closed, gland sealing steams leaked from the respective turbines 118, 130 and 142 are condensed in the gland steam condenser 154. This prevents an air inflow in the condenser from the glands of the steam turbines 118, 130 and 142.

Subsequently, the stop valve 210 on the first air extracting pipe 206 is closed, whereby the pressure in the upper space A is dropped. In the meanwhile, while the condensate is subjected to deaeration it is recirculated from the hot well 150 such that it flows back to the hot well 150 via the gland steam condenser 154, the condensate recirculating system 160 and the deaerating equipment 214, whereby the dissolved oxygen concentration is reduced to the limited value of 80 ppb specified for the plant start-up.

Thereafter, when it is confirmed that an air in the upper space A is exhausted and the pressure in the upper space A is dropped till the pressure in the lower space B, the isolation valves 204 is opened while the air shut-off valve 236 is kept fully opened, whereby the upper space A is communicated with the lower space B. In addition, when it is confirmed that the passageway extending from the condensate recirculating system 160 to the steam drums 112, 124 and 136 via the feed water pumps 108, 120 and 132 is fully filled with a pure water, the condensate (feed water) is supplied from the hot well 150 to the steam drums 112, 124 and 136. With this condensate, it is possible to satisfactorily meet the requirement for a limited value of 80 ppb and lower of a dissolved oxygen concentration specified for the start-up operation with the aid of the deaerating unit 214. Therefore, according to the present invention, a start-up operation can be completed within a short time even after the period of shut-down is long. Consequently, the method of the present invention makes it possible to quickly meet the requirement for supplying electricity to the user side.

It should be noted that the present invention should not be limited only to the above-described embodiment but it may be carried out in the following manner.

Figure 4:
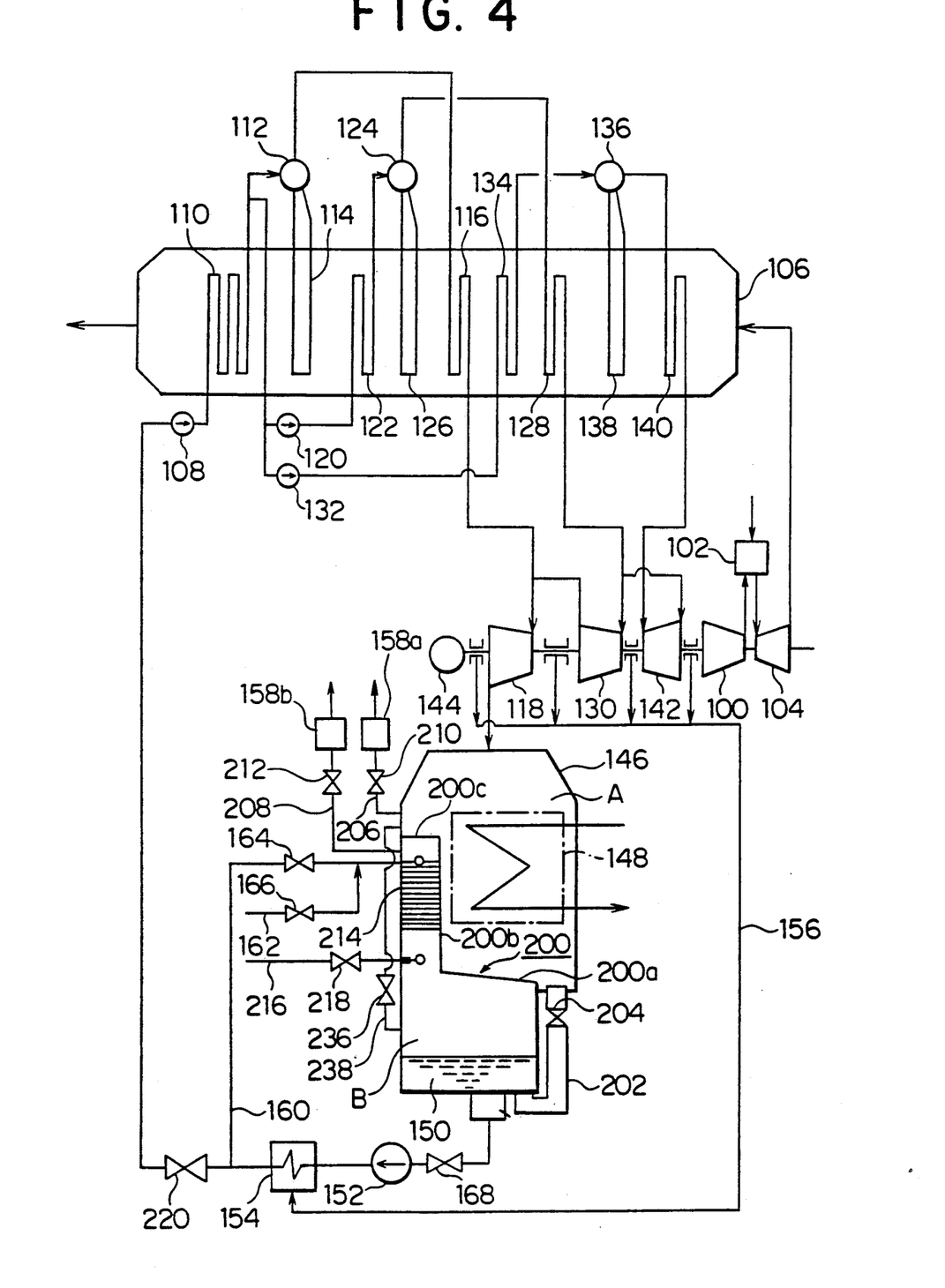
FIG. 4 is an illustrative view similar to FIG. 1, particularly showing essential components for practicing a start-up method of a steam turbine plant in accordance with other embodiment of the present invention.

FIG. 4 is a schematic view which illustrates another embodiment of the present invention wherein two venting equipments, i.e., a venting equipment 158a for the upper space A and a venting equipment 158b for the lower space B are arranged to operate separately from each other. Since the condenser employable for practicing this embodiment is constructed in the same manner as that in the first embodiment, a start-up operation can be performed in accordance with the same procedure as mentioned above with the same advantageous effects.

Figure 5:
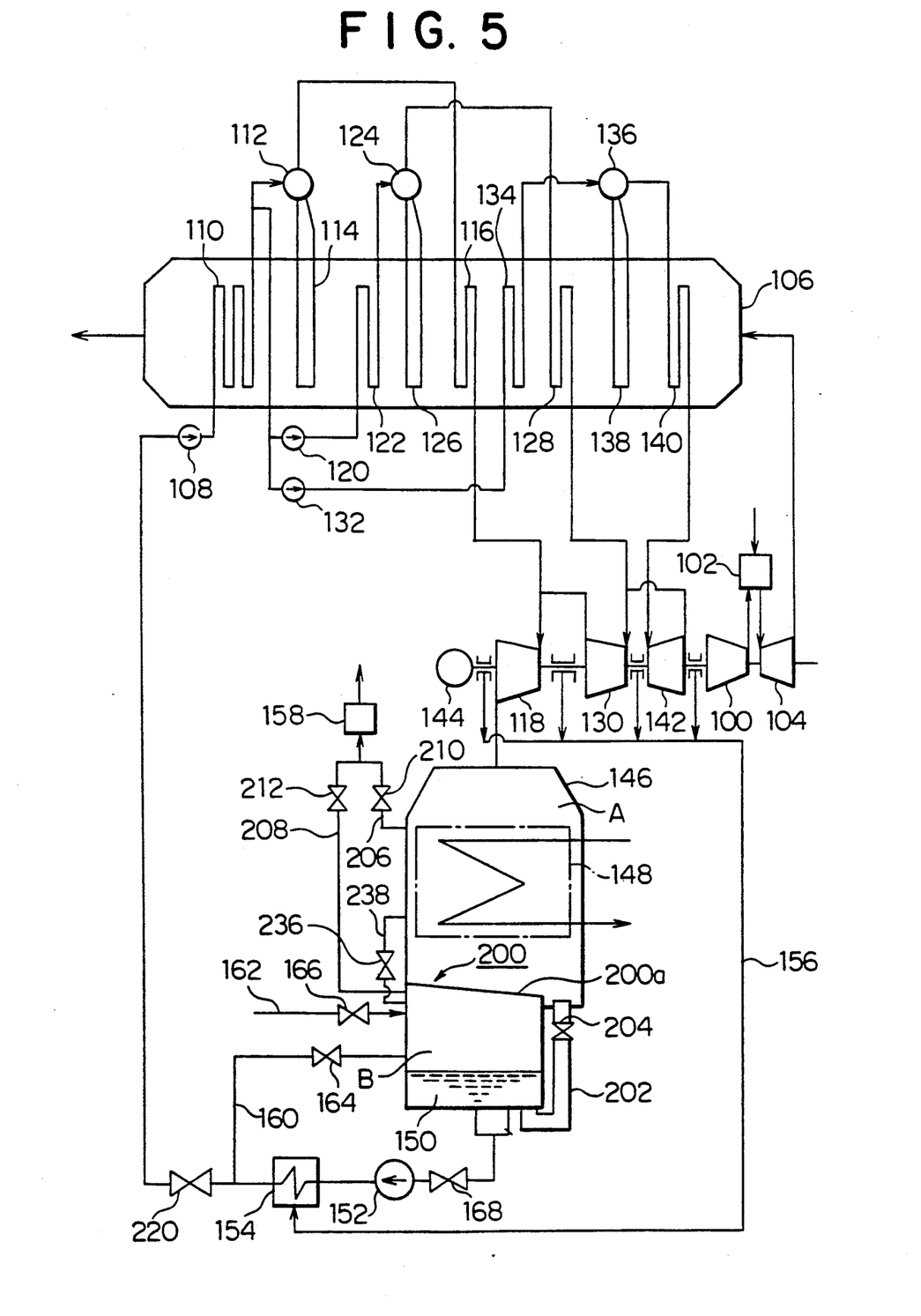
FIG. 5 is an illustrative view similar to FIG. 1, particularly showing essential components for practicing a start-up method of a steam turbine plant in accordance with another embodiment of the present invention.

The present invention has been described above with respect to the embodiments wherein the deaerating unit 214 is accommodated in the lower space B of the condenser 146. In some case, however, no deaeration may be required with the deaerating unit 214 when shut-down period of the steam turbine plant is short. In the case where the shut-down period of the steam turbine plant is short in that way, modification may be made as illustrated in FIG. 5 such that a condenser 146 having no deaerating unit accommodated in the lower space B is substituted for the deaerating unit 214 employed for the aforementioned embodiments.

Figure 6:
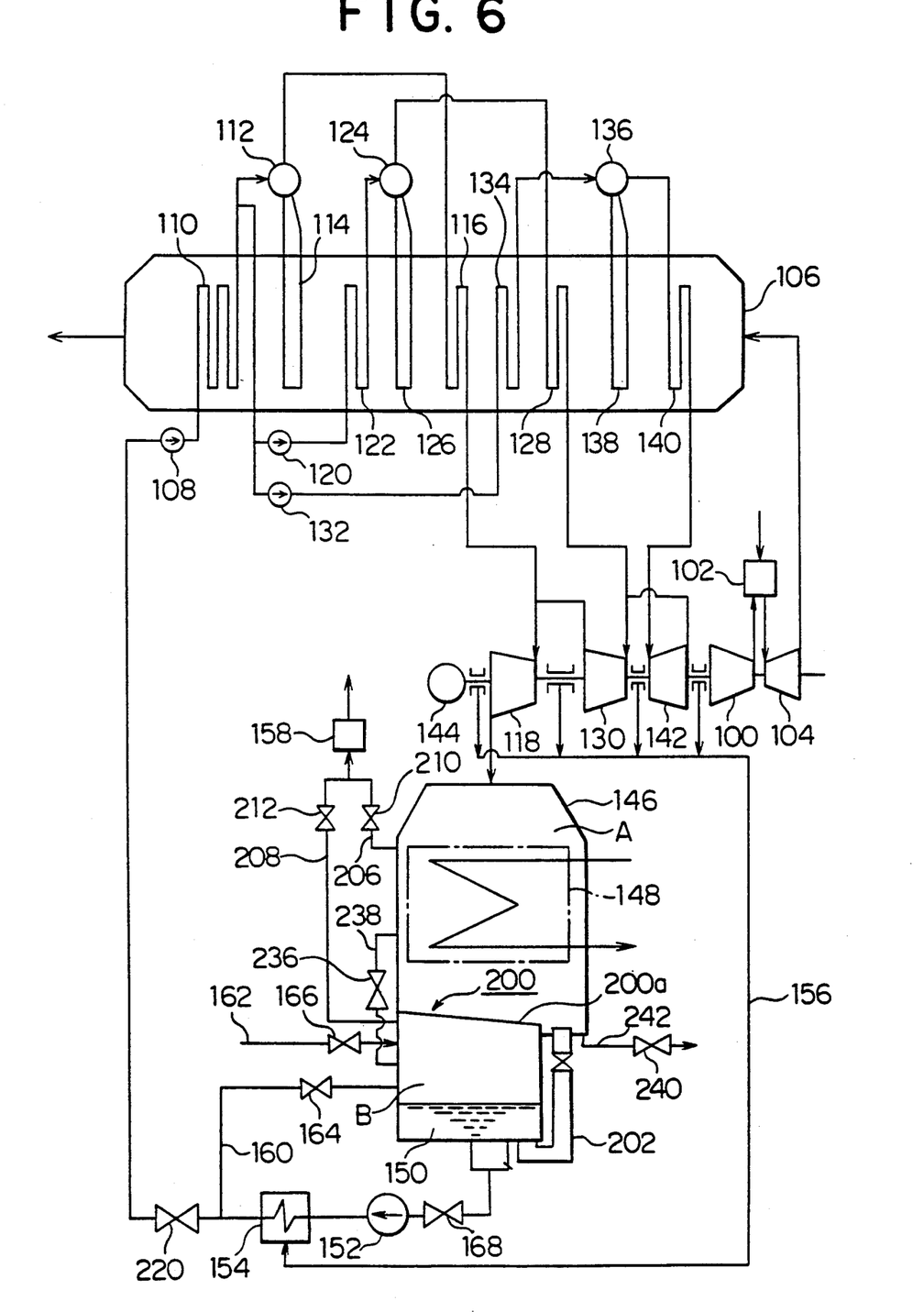
FIG. 6 is an illustrative view similar to FIG. 1, particularly showing essential components for practicing a start-up method of a steam turbine plant in accordance with further another embodiment of the present invention.

In addition, another modification may be made as illustrated in FIG. 6. Specifically, a drain pipe 242 having a stop valve 240 disposed thereof is connected to the bottom of the upper space A of the condenser 146. Before the plant startup, the stop valve 240 is opened to drain the condensate having a high level of dissolved oxygen concentration in the upper space A through the drain pipe 242. After completion of the drainage of the condensate is confirmed, the isolation valves 204 is opened, whereby the upper space A is communicated with the lower space B. According to this embodiment, an occurrence of undesirable mixing of the condensate having a high dissolved oxygen concentration with the condensate in the hot well 150 can be prevented reliably.

The present invention has been described above with respect to a combined cycle type power plant. However, the present invention should not be limited only to this. Alternatively, the present invention may equally be applied to a steam turbine plant with the same advantageous effects as mentioned above wherein the steam turbine plant includes a steam boiler, a turbine driven by the steam generated in the boiler, a condenser in which the steam exhausted from the turbine is received and condensed and a feed water pump for pressurizing a condensate (feed water) so as to allow it to be pumped to the boiler.

What is claimed is:

1. In a start-up method of a steam turbine plant including a condenser wherein a tube bundle for condensing an exhaust steam from a steam turbine and a hot well for storing a condensate therein are arranged in the interior of a condenser shell, the improvement wherein;

the interior of said condenser shell is airtightly divided into two spaces with a partition plate therebetween, one of them being an upper space containing said tube bundle and the other one being a lower space containing said hot well, at least one connecting pipe extends between said upper space and said lower space, said connecting pipe being provided with a isolation valve to isolate the both spaces at the position therebetween, at the shut-down of said turbine plant, said isolation valve on said connecting pipe is closed to isolate the lower space from the upper space and to maintain the lower space in vacuum, and at the start-up of said steam turbine plant, said isolation valve on said connecting pipe is opened after the upper space is evacuated, whereby the upper space is communicated with the lower space which has been maintained in vacuum.

2. The method as claimed in claim 1, wherein a balance pipe extends between the upper space and the lower space, said balance pipe being provided with an air shut-off valve therebetween, and at the start-up of said steam turbine plant, said air shut-off valve is opened after the upper space is evacuated, whereby the upper space is communicated with the lower space which has been maintained in vacuum.

3. The method as claimed in claim 1, wherein a drain pipe having a stop valve disposed thereon is connected to the upper space so as to allow the condensate in the upper space to be drained through said drain pipe. and at start-up of said steam turbine plant, said stop valve on said connecting pipe is opened after the condensate in the upper space is drained through said drain pipe by opening said stop valve on said drain pipe, whereby the upper space is communicated with the lower space which has been maintained in vacuum.

4. In a start-up method of a steam turbine plant including a condenser wherein a tube bundle for condensing an exhaust steam from a steam turbine and a hot well for storing a condensate therein are accommodated in the interior of a condenser shell, said steam turbine plant further including a condensate recirculating system for recirculating said condensate in said hot well and then recirculating said condensate to said hot well, the improvement wherein;

the interior of said condenser shell is airtightly divided into two spaces with a partition plate therebetween, one of them being an upper spaces containing said tube bundle and the other one being a lower space containing said hot well, at least one connecting pipe extends between said upper space and said lower space, said connecting pipe being provided with a valve to isolate the both spaces from each other at the position therebetween, a deaerating unit for deaerating of the condensate is arranged in the region above the hot well in the lower space so as to allow the condensate which has been subjected to deaeration therein to be recirculated through said condensate recirculating system, at the start-up of said steam turbine plant, said isolation valve on said connecting pipe is closed to interrupt communication between the upper space and the lower space, whereby the condensate extracted from the hot well is supplied above said deaerating unit through said condensate recirculating system so as to allow the condensate to be subjected to deaeration in said deaerating unit while the lower space is maintained in vacuum, thereafter, the isolation valve on the connecting pipe is opened to establish communication between the upper space and the lower space after the pressure in the upper space is substantially equalized to the present pressure in the lower space, and then, the condensate is fed to boiler from the hot well.

5. The method as claimed in claim 4, wherein a balance pipe having an air shut-off valve disposed thereon extend between the upper space and the lower space;

at the start-up of said steam turbine plant, said isolation valve on said connecting pipe and said air shut-off valve on said balance pipe are closed to interrupt communication between the upper space and the lower space, whereby the condensate extracted from the hot well is supplied into said deaerating unit through said condensate recirculating system so as to allow the condensate to be subjected to deaeration in said deaerating unit while the lower space is maintained in vacuum, thereafter, said air shut-off valve on said balance pipe is opened after the pressure in the upper space is substantially equalized to the present pressure in the lower space, and said isolation valve on said connecting pipe is then opened so as to allow the upper space to be communicated with the lower space, and thereafter, the condensate is fed to said boiler from the hot well.

6. A condenser serving to condense an exhaust steam from a steam turbine thereby to condensate a steam wherein said condenser is employable for practicing a start-up method of a steam turbine plant, said condenser comprising;

a condenser shell constructed in the form of a container, a water inlet chamber arranged on the one side of said condenser shell and a water outlet chamber arranged on the other side of the same, a tube bundle composed of a number of tubes through which a cooling water flows, said tubes extending in the shell so as to communicate said water inlet chamber with said water outlet chamber, a hot well arranged below said tube bundle to receive and store therein the condensate which has been produced by condensation of the exhaust steam with the aid of said cooling water flowing through the tube bundle, a partition plate serving to airtightly divide the interior of the condenser shell into two spaces, one of them being an upper space containing the tube bundle and the other one being a lower space containing the hot well, at least one connecting pipe by way of which the bottom of the upper space is communicated with the hot well in the lower space, and at least one isolating valve which isolates the both spaces from each other, said isolation valve being disposed on said connecting pipe.

7. The condenser as claimed in claim 6 further including;

a balance pipe by way of which the upper space is communicated with the lower space, and an air shut-off valve disposed on said balance pipe.

8. The condenser as claimed in claim 6 further including;

a condensate recirculating pipe line of which upper end is opened to the interior of the condenser shell at the position located above the hot well so as to allow the condensate to be recirculated to the not well through said condensate recirculating pipe line, and a deaerating unit arranged in the interior of the shell in the region located above the hot well so as to deaerate the condensate through said condensate recirculating pipe line.

9. The condenser as claimed in claim 6 further including;

a drain pipe connected to the bottom of the upper space so as to drain the condensate in the upper space, and a stop valve disposed on said drain pipe.

10. The condenser as claimed in claim 6, wherein said connecting pipe includes a L-shaped pipe portion of which opposite ends are enlarged to assume a flange-shaped configuration so as to facilitate connection to another pipe portion, said L-shaped pipe portion being removable from said connecting pipe.

11. The condenser as claimed in claim 6, wherein said partition plate comprises an intermediate bottom plate arranged below the tube bundle, a rectangular vertical plate arranged to upwardly extend from said intermediate bottom plate along the side wall of the condenser shell, a ceiling plate arranged to connect the upper end of said vertical plate to the inside wall of the shell and two enclosure plates arranged to surround the opposite ends of the region defined by said vertical plate and said ceiling plate.

* * * * *

UNITED STATES PATENT AND TRADEMARK OFFICE
CERTIFICATE OF CORRECTION

PATENT NO. : 5,095,706

DATED : March 17, 1992

INVENTOR(S) : KOHEI SAITO, ET AL

It is certified that error appears in the above-identified patent and that said Letters Patent is hereby corrected as shown below:

In column 1, line 17, change "produce" to --producing--.

In column 2, line 48, delete "a".

In column 4, line 1, change "islation" to --isolation--; same line, change "spaced" to --spaces--;

line 34, delete "the" first occurrence;

line 57, change "embodiment" to --embodiments--;

line 65, delete "further"; and line 68, change "showing" to --shows".

In column 5, line 27, delete "the" first occurrence; same line, change "is" to --and--; and line 39, change "condensare" to --condensate--.

In column 6, line 60, change "is" to --are--; delete "to each other"; and line 65, change "is" to --are--.

In column 7, line 3, change "opened" to --open--;

line 5, change "is" to --are--; delete "to each other";

UNITED STATES PATENT AND TRADEMARK OFFICE
CERTIFICATE OF CORRECTION

PATENT NO. : 5,095,706
DATED : March 17, 1992
INVENTOR(S) : KOHEI SAITO, ET AL

It is certified that error appears in the above-identified patent and that said Letters Patent is hereby corrected as shown below:

```
          line 6, delete "the";
          line 14, delete "still";
          line 15, change "unchangeably" to
--without change--;
          line 16, change "few" to --little--.
          line 22, after "plant" insert --,--;
          line 23, after "short" insert --(--; same line,
after "operation" insert --),--;
          line 32, change "unchangeably" to --without
change--;
          line 48, after "160" add --,--;
          line 57, change "equalized" to --equal--; and
          line 58, change "is" to --are--.
     In column 8, line 18, delete "at all";
          line 25, change "an" to --the--;
          line 29, change "216" first occurrence to
--218--;
          line 51, change "meanwhile" to --meantime--;
          line 52, after "deacration" insert --,--;
```

UNITED STATES PATENT AND TRADEMARK OFFICE
CERTIFICATE OF CORRECTION

PATENT NO. : 5,095,706
DATED : March 17, 1992
INVENTOR(S) : KOHEI SAITO, ET AL

It is certified that error appears in the above-identified patent and that said Letters Patent is hereby corrected as shown below:

```
         line 59, change "an" to --the--;
         line 61, change "till" to --to--;
         line 62, change "is" to --are--;
In column 9, line 29, change "case" to --cases--;
         line 40, change "thereof" to --thereon--;
         line 42, change "startup" to --start-up--; and
         line 46, change "is" to --are--.
In column 10, line 10, change "a" to --an--;
         line 53, change "spaces" to --space--; and
         line 58, delete "the".
In column 11, line 16, change "extend" to
--extends--.
In column 12, line 11, delete "the"; and
         line 24, change "not" to --hot--.
```

Signed and Sealed this

Twenty-eighth Day of September, 1993

Attest:

BRUCE LEHMAN

*Attesting Officer*    Commissioner of Patents and Trademarks